US010323703B2

(12) United States Patent
Cool et al.

(10) Patent No.: US 10,323,703 B2
(45) Date of Patent: Jun. 18, 2019

(54) CALIPER FOR A DISC BRAKE CONFIGURED TO FACILITATE ATTACHMENT OF A BRAKE ACTUATOR (71) Applicant: Bendix Spicer Foundation Brake LLC, Elyria, OH (US)

(72) Inventors: Lonnie F. Cool, N. Olmsted, OH (US); Richard L. Lantz, Clinton, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 57 days.

(21) Appl. No.: 15/470,747

(22) Filed: Mar. 27, 2017

(65) Prior Publication Data
US 2018/0274609 A1 Sep. 27, 2018

(51) Int. Cl.
*F16D 65/00* (2006.01)
*B62L 3/02* (2006.01)
(Continued)

(52) U.S. Cl.
CPC .......... *F16D 65/0068* (2013.01); *B62L 1/005* (2013.01); *B62L 3/023* (2013.01); *F16D 55/225* (2013.01); *F16D 65/0056* (2013.01); *F16D 65/0075* (2013.01); *F16D 65/183* (2013.01); *F16D 2055/0016* (2013.01)

(58) Field of Classification Search
CPC .. F16D 65/567; F16D 65/568; F16D 2125/68; F16D 2125/70; F16D 2055/007; F16D 2055/0016; F16D 2125/645; F16D 65/0043; F16D 65/095; F16D 2055/0008;
(Continued)

(56) References Cited

U.S. PATENT DOCUMENTS 3,647,031 A 3/1972 Burnett
4,064,973 A * 12/1977 Deem .................. F16D 65/567
188/196 C
(Continued)

FOREIGN PATENT DOCUMENTS

WO 97/30294 A1 8/1997

OTHER PUBLICATIONS

"Service Data SD-23-7541 Bendix ADB22X, ADB22X-V Air Disc Brakes," Bendix Spicer Foundation Brake LLC (Aug. 2013).
(Continued)

*Primary Examiner* — Bradley T King
*Assistant Examiner* — Mahbubur Rashid
(74) *Attorney, Agent, or Firm* — Reising Ethington P.C.

(57) ABSTRACT

A disc brake caliper includes actuator and reaction portions disposed on opposite sides of a rotor and a bridge portion extending between the actuator and reaction portions and disposed radially outward of the rotor. The actuator portion houses a piston and a lever and defines a mounting flange for a brake actuator. Movement of the lever by the brake actuator causes the piston and the reaction portion to urge brake pads against opposite sides of the rotor. The mounting flange defines a pushrod bore and a fastener bore that receive a pushrod of the actuator and a shank of a fastener extending from the actuator, respectively. The fastener bore has a diameter that varies along at least a portion of a length of the bore beginning from a first end of the bore proximate the actuator and tapering moving towards a second end of the bore distant from the actuator.

20 Claims, 5 Drawing Sheets (51) Int. Cl.
  *B62L 1/00* (2006.01)
  *F16D 55/225* (2006.01)
  *F16D 65/18* (2006.01)
  *F16D 55/00* (2006.01)

(58) Field of Classification Search
  CPC .................. F16D 2125/58; F16D 55/14; F16D 55/22655; F16D 55/46; F16D 65/60
  USPC ....................................................... 188/72.9
  See application file for complete search history.

(56) References Cited

U.S. PATENT DOCUMENTS

| | | | | |
|---|---|---|---|---|
| 5,647,459 | A * | 7/1997 | Buckley | F16D 55/22655 188/72.9 |
| 5,697,474 | A | 12/1997 | Antony et al. | |
| 8,936,138 | B2 * | 1/2015 | Morris | F16D 55/226 188/250 B |
| 2008/0047787 | A1 | 2/2008 | Scheckelhoff et al. | |
| 2009/0159383 | A1 * | 6/2009 | Roberts | F16J 1/008 188/305 |
| 2010/0044168 | A1 | 2/2010 | Kloos et al. | |
| 2012/0298456 | A1 * | 11/2012 | Morris | F16D 55/226 188/72.4 |
| 2014/0231191 | A1 * | 8/2014 | Morais | F16D 65/0062 188/73.31 |
| 2016/0230823 | A1 * | 8/2016 | Smith | F16D 55/22655 |
| 2017/0082157 | A1 | 3/2017 | Son et al. | |

OTHER PUBLICATIONS

"Service Data SD-23-7550 Air Disc Brake (SB-6 and SB-7)," Bendix Commercial Vehicle Systems LLC (2002).
International Search Report issued in corresponding International (PCT) Patent Application No. PCT/US2018/024242 (dated Aug. 3, 2018)
Written Opinion issued in corresponding International (PCT) Patent Application No. PCT/US2018/024242 (dated Aug. 3, 2018).

* cited by examiner

CALIPER FOR A DISC BRAKE CONFIGURED TO FACILITATE ATTACHMENT OF A BRAKE ACTUATOR

BACKGROUND OF THE INVENTION a. Field of the Invention

This invention relates to vehicle brakes. In particular, the invention relates to a caliper for a disc brake that is configured to facilitate attachment of a brake actuator to the caliper by improving access for tools used during the attachment process.

b. Background Art

A conventional disc brake includes a brake pad carrier that is configured to be affixed to a vehicle wheel assembly. The carrier supports brake pads that are disposed on opposite sides of a rotor of the wheel assembly. The disc brake further includes a caliper that is mounted on the carrier. The caliper has a body with portions disposed on both sides of the rotor. A brake actuator is mounted on the caliper body. Movement of the brake actuator causes movement of a piston housed within an inboard portion of the caliper body towards an inboard brake pad to force the brake pad against the inboard side of the rotor. The same movement of the brake actuator causes movement of the caliper body in a second direction—opposite the direction of movement of the piston—to bring an outboard portion of the caliper body into engagement with an outboard brake pad and to force the brake pad against the outboard side of the rotor.

In conventional disc brakes, the brake actuator is mounted to the caliper by inserting fasteners extending from the actuator through bores in a mounting flange of the caliper. Nuts are located on the end of the fasteners and rotated to draw the actuator into secure engagement with the mounting flange of the caliper. In some disc brakes, there is limited space to position and/or orient socket wrenches or other tools that are used to rotate the nuts in order to secure the actuator to the caliper. In particular, the caliper body must be configured to receive a pushrod of the actuator, the piston that acts against one of the brake pads and other components necessary to translate movement of the actuator pushrod to the piston. As a result, the outer profile of the caliper body in the area where the brake actuator is mounted (i.e., near the mounting flange) is often configured in such a way that space for tools used in rotating the nuts is limited.

The inventors herein have recognized a need for a caliper for a disc brake that will minimize and/or eliminate one or more of the above-identified deficiencies.

BRIEF SUMMARY OF THE INVENTION

This invention relates to vehicle brakes. In particular, the invention relates to a caliper for a disc brake that is configured to facilitate attachment of a brake actuator to the caliper by improving access for tools used during the attachment process.

A caliper for a disc brake in accordance with one embodiment of the invention includes an actuator portion configured to be disposed on a first side of a rotor. The actuator portion is configured to house a piston and a lever and defines a mounting flange configured for mounting a brake actuator. The piston is configured to urge a first brake pad towards the first side of the rotor in response to movement of the lever by the brake actuator. The caliper further includes a reaction portion configured to be disposed on a second side of the rotor opposite the first side of the rotor. The reaction portion is configured to urge a second brake pad towards the second side of the rotor in response to movement of the lever by the brake actuator. The caliper further includes a bridge portion extending between the actuator portion and the reaction portion and configured to be disposed radially outward of the rotor. The mounting flange of the actuator portion defines a pushrod bore configured to receive a pushrod of the brake actuator and a fastener bore configured to receive a shank of a fastener extending from the brake actuator. The fastener bore has a diameter that varies along at least a portion of a length of the fastener bore beginning from a first end of the fastener bore proximate the brake actuator and tapering moving towards a second end of the fastener bore distant from the brake actuator.

A disc brake in accordance with one embodiment of the invention includes a carrier configured to support first and second brake pads and a caliper coupled to the carrier and configured for movement relative to the carrier. The caliper includes an actuator portion configured to be disposed on a first side of a rotor. The actuator portion configured to house a piston and a lever and defines a mounting flange configured for mounting a brake actuator. The piston is configured to urge the first brake pad towards the first side of the rotor in response to movement of the lever by the brake actuator. The caliper further includes a reaction portion configured to be disposed on a second side of the rotor opposite the first side of the rotor. The reaction portion is configured to urge the second brake pad towards the second side of the rotor in response to movement of the lever by the brake actuator. The caliper further includes a bridge portion extending between the actuator portion and the reaction portion and configured to be disposed radially outward of the rotor. The mounting flange of the actuator portion defines a pushrod bore configured to receive a pushrod of the brake actuator and a fastener bore configured to receive a shank of a fastener extending from the brake actuator. The fastener bore has a diameter that varies along at least a portion of a length of the fastener bore beginning from a first end of the fastener bore proximate the brake actuator and tapering moving towards a second end of the fastener bore distant from the brake actuator.

A method for mounting a brake actuator on a caliper of a disc brake in accordance with one embodiment of the invention includes the step of positioning the brake actuator such that a pushrod of the brake actuator is aligned with a pushrod bore in a mounting flange of the caliper. The method further includes the step of inserting a shank of a fastener through a fastener bore in the mounting flange. The fastener is configured to couple the brake actuator to the caliper. The fastener bore has a diameter that varies along at least a portion of a length of the fastener bore beginning from a first end of the fastener bore proximate the brake actuator and tapering moving towards a second end of the fastener bore distant from the brake actuator. The method further includes the steps of orienting the fastener such that a longitudinal axis of the fastener is at an angle relative to a center axis of the fastener bore and drawing the brake actuator towards the caliper such that the longitudinal axis of the fastener is drawn parallel to or coincident with the enter axis of the fastener bore.

A caliper for a disc brake in accordance with the invention represents an improvement as compared to conventional calipers. In particular, the configuration of the fastener bore in the brake actuator mounting flange of the caliper allows the fastener to be oriented at an angle relative to the center axis of the fastener bore when the fastener is initially inserted into the bore. This orientation provides additional space on the side of the mounting flange opposite the brake actuator for a tool to grasp either the fastener or a nut disposed about the fastener.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 6A-5C are partial cross-sectional views of the caliper of FIG. 4 illustrating steps in a method for mounting a brake actuator to a caliper of a disc brake in accordance with one embodiment of the present teachings.

DETAILED DESCRIPTION OF THE INVENTION

Figure 1:
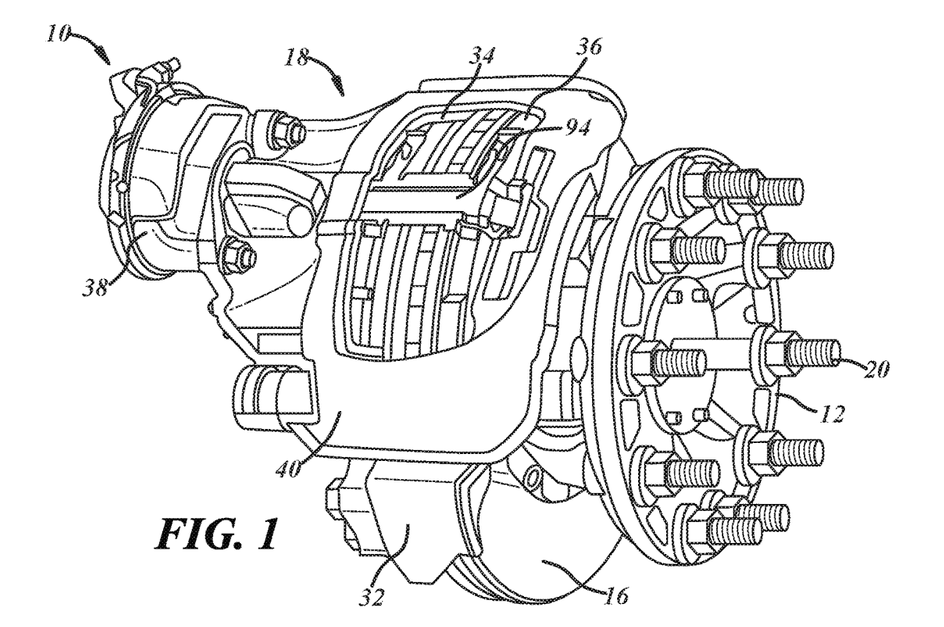
FIG. 1 is a perspective view of a disc brake in accordance with one embodiment of the present teachings mounted on a vehicle wheel end assembly.
Figure 2:
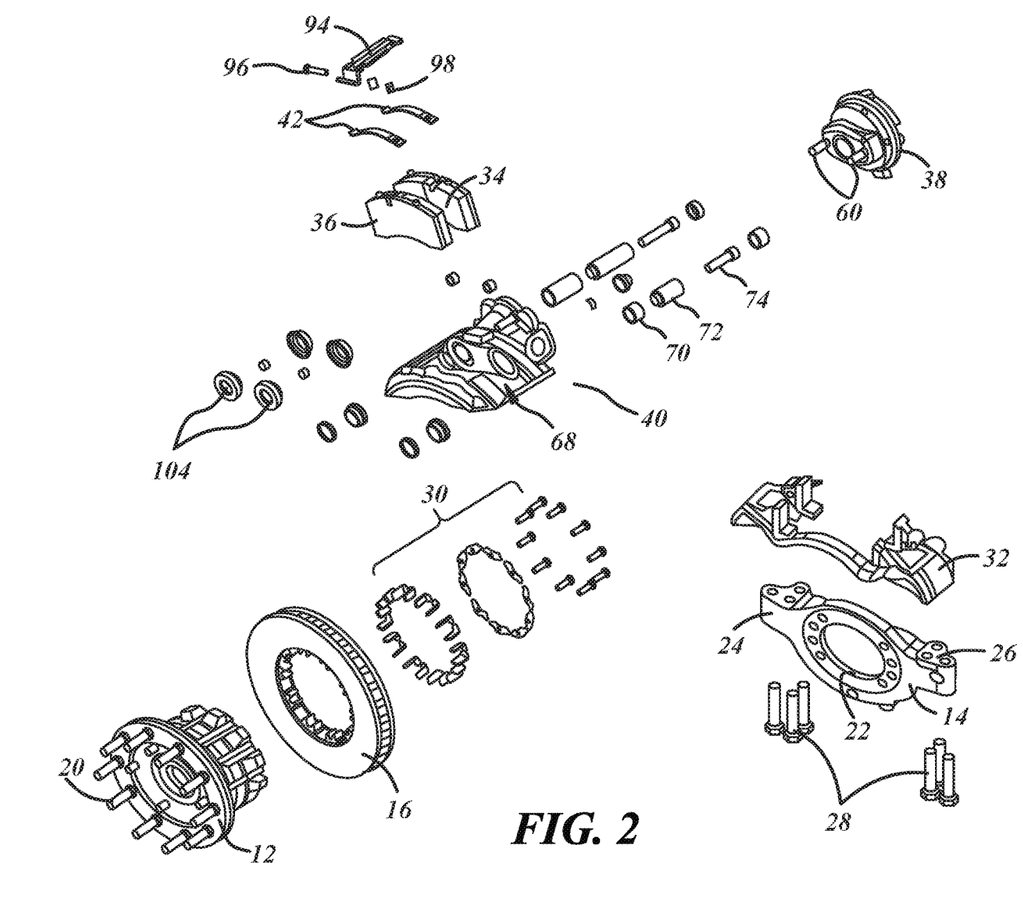
FIG. 2 is an exploded perspective view of the wheel end assembly and disc brake shown in FIG. 1.
Figure 3:
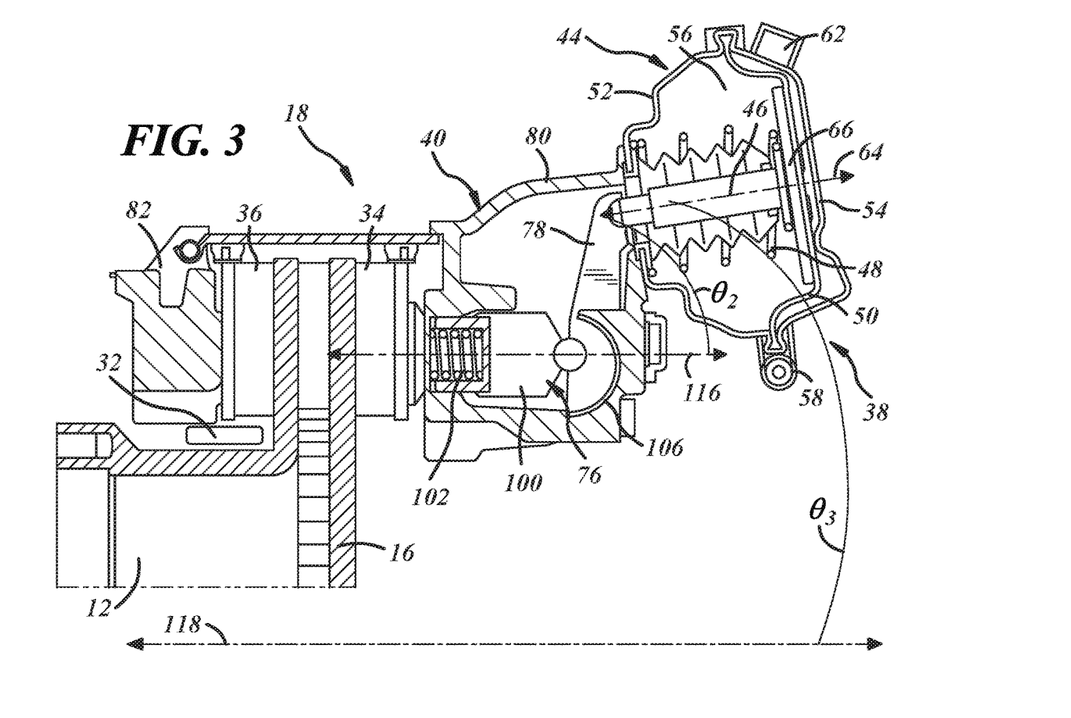
FIG. 3 is a cross-sectional view of portions of the wheel end assembly and disc brake shown in FIG. 1.

Referring now to the drawings wherein like reference numerals are used to identify identical components in the various views, FIGS. 1-3 illustrate a wheel end assembly 10 incorporating a disc brake in accordance with one embodiment of the present teachings. Assembly 10 is particularly configured for use on heavy commercial vehicles such as trucks, trailers and buses, but it should be understood that assembly 10 may find application on a wide variety of vehicles. Assembly 10 may include a wheel hub 12, an anchor plate 14, a rotor 16 and a disc brake 18 in accordance with the present teachings.

Wheel hub 12 is provided for mounting a vehicle wheel on an axle of the vehicle. In the illustrated embodiment, hub 12 is configured for use with a steer axle of the vehicle. It should be understood, however, that hub 12 may alternatively be configured for use with a drive axle or trailer axle. Hub 12 may define a central bore configured to receive a stub axle and bearings that allow hub 12 to rotate relative to the axle. Hub 12 also includes a plurality of outwardly extending bolls 20 on which the wheel may be mounted for rotation with hub 12.

Anchor plate 14 is provided for mounting disc brake 18 to the vehicle. Referring to FIG. 2, anchor plate 14 defines a central aperture 22 through which a vehicle axle may extend. Plate 14 further defines mounting flanges 24, 26 configured to support brake 18 and through which fasteners 28 for brake 18 may extend. In the illustrated embodiment, fasteners 28 extend substantially perpendicular to the axis of rotation of wheel nub 12. In an alternative embodiment, anchor plate 14 is configured such that fasteners 28 extend parallel to the axis of rotation.

Rotor 16 works together with brake 18 to establish a braking torque in a vehicle wheel in order to slow or stop rotation of the wheel and movement of the vehicle. Rotor 16 may be made from a variety of metals and metal alloys including iron. Rotor 16 is annular in shape and configured for mounting on wheel hub 12. Rotor 16 may be secured to hub 12 using conventional fasteners. Alternatively, as shown in the illustrated embodiment, rotor 16 may define a plurality of splines in a radially inner perimeter configured to engage mating splines on a radially outer mounting surface of hub 12. Additional hardware 30 including spacers and fasteners may be used to maintain the position of rotor 16 on hub 12. Rotor 16 transmits a braking torque to hub 12 which in turn transmits the torque to the vehicle wheel. Rotor 16 may include a pair of braking discs connected by webs to increase the surface area of the rotor for use in dissipating heat from the rotor generated during braking into the air and thereby minimize heat distortion and optimize thermal stress endurance.

Disc brake 18 is provided to apply a braking torque to rotor 16 in order to slow or halt rotation of one or more vehicle wheels. Disc brake 18 is particularly adapted for use on heavy vehicles and may be used with wheels mounted on drive axles, steer axles or trailer axles. It should be understood, however, that brake 18 could be used on a wide variety of vehicles and in non-vehicular applications. Brake 18 includes a brake pad carrier 32, brake pads 34, 36, an actuator 38 and a caliper 40 in accordance with the present teachings.

Carrier 32 is provided to support brake pads 34, 36. Carrier 32 also absorbs circumferential loads during actuation of brake 18 and transfers those loads to the axle through anchor plate 14. Carrier 32 is rigidly mounted to the axle through anchor plate 14 using fasteners 28 that extend through anchor plate 14 and into carrier 32. Carrier 32 has a body that is configured to support brake pads 34, 36 and to locate brake pads 34, 36 on inboard and outboard sides of rotor 16.

Brake pads 34, 36 are provided to generate friction during engagement with rotor 16 in order to slow the rotation of rotor 16 and, ultimately, the vehicle wheel. Brake pads 34, 36 are supported on carrier 32 with brake pad 34 disposed on an inboards side of rotor 16 and brake pad 36 disposed on an outboard side of rotor 16. Each brake pad 34, 36 may include a friction material configured to engage rotor 16, a backing plate that supports the friction material and is engaged by an actuating mechanism of the brake and a bonding material that couples the friction material to the backing plate. Referring to FIG. 2, pads 34, 36 may be retained on carrier 32 using springs 42.

Actuator 38 is provided to control actuation of brake 18. In the illustrated embodiment, actuator 38 comprises a pneumatic service actuator. It should be understood, however, that actuator 38 may take on a variety of forms including actuators that are configured to operate brake 18 as both a parking and service brake. Referring to FIG. 3, actuator 38 may include a housing 44, a pushrod 46 movable between a released position and an applied position, a spring 48, and a diaphragm 50.

Housing 44 provides structural support for the other components of actuator 38 and protects those components from foreign objects and elements. Housing 44 may include multiple housing members 52, 54 that together define a brake chamber 56 and receive diaphragm 50 therebetween. Members 52, 54 may be held in place by crimping one or both of members 52, 54 or by using a conventional clamp 58 disposed about the circumference of housing 44. Member 52 defines a central aperture centered through which pushrod 46 extends. Referring to FIG. 2, member 52 also defines surrounding apertures through which mounting bolts 60 may extend for mounting actuator 38 to caliper 40 as discussed in greater detail below. Referring again to FIG. 3, member 54 further defines one or more fluid ports 62 through which fluid pressure may be introduced to or removed from chamber 56 to cause movement of diaphragms 50.

Pushrod 46 transmits forces to caliper 40 in order to apply or release brake 18. Pushrod 46 is disposed about and moves along an axis 64. One longitudinal end of pushrod 46 is disposed outside of housing 44 and is configured to engage a corresponding actuating component within caliper 40. The opposite longitudinal end of pushrod 46 may define a pressure plate 66. Plate 66 provides a surface on one side configured to engage diaphragm 50 and a surface on the opposite side configured to act as a spring seat for spring 48.

Spring 48 is provided to bias pushrod 46 and brake 18 to a released position. Spring 48 is conventional in the art and is disposed within brake chamber 56 on one side of diaphragm 50. Spring 48 is disposed about pushrod 46 and is seated between one end of housing member 52 and pressure plate 66 of pushrod 46.

Diaphragm 50 is provided to urge pushrod 46 outward from housing 44 in response to fluid pressure in order to move brake 18 to an applied position. Diaphragm 50 is disposed within chamber 56 and may be held between members 52, 54 of housing 44. Fluid pressure may be introduced to service chamber 56 on one side of diaphragm 50 opposite the side on which pushrod 46 is disposed through port 62 in member 54. Introduction of fluid pressure to chamber 56 urges pushrod 46 to an applied position.

Caliper 40 is provided urge brake pads 34, 36 into engagement with rotor 16 in response to movement of pushrod 46 to an applied position. Referring to FIG. 2, caliper 40 includes a body 68 and means, such as bushings 70, guide pins 72, and bolts 74 for coupling caliper 40 to carrier 32 and permitting movement of caliper 40 relative to carrier 32. Referring to FIG. 3, caliper 40 also includes means, such as piston 76 for urging inboard brake pad 34 towards the inboard side of rotor 16, and means, such as lever 78 for causing movement of piston 76 and body 68 in response to movement of pushrod 46. Caliper 40 may further include means (not shown) for adjusting the position of caliper 40 relative to carrier 32 in order to compensate for wear of friction materials and maintain brake stroke. Caliper 40 may also include wear sensors (not shown) that generate electronic signals indicative of the condition of rotor 16 and/or brake pads 34, 36.

Figure 4:
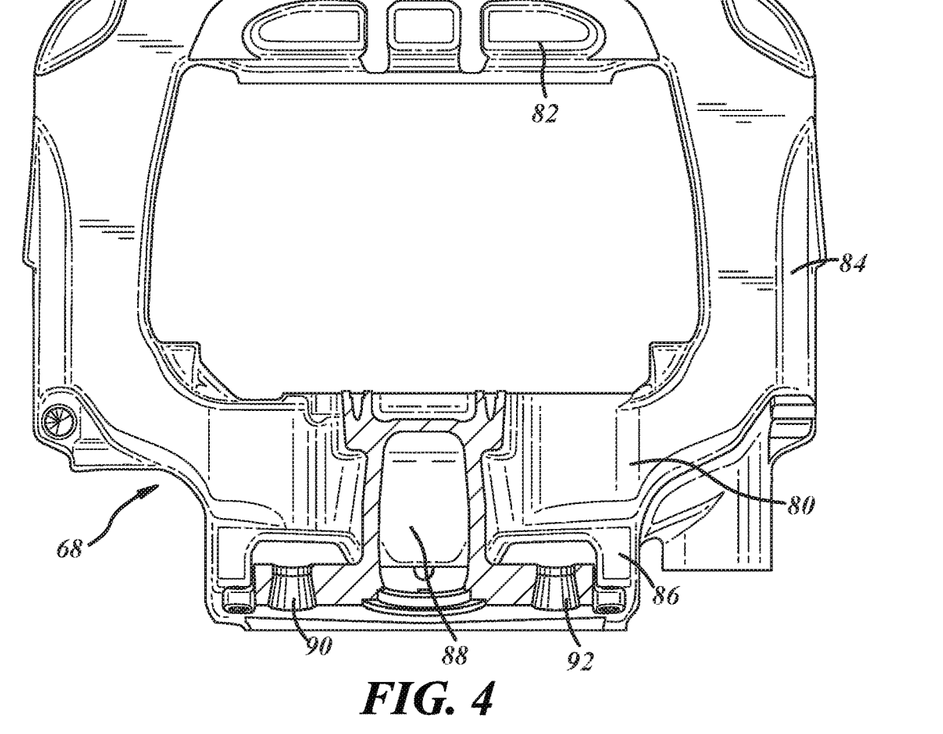
FIG. 4 is a cross-sectional view of a caliper for a disc brake in accordance with one embodiment of the present teachings.

Referring now to FIG. 4, body 68 provides structural support for the other components of caliper 40 and protects those components from foreign objects and elements. Body 68 also provides a means for urging outboard brake pad 36 against the outboard side of rotor 16. Body 68 may comprise a unitary (single piece) structure as opposed to a multiple piece structure in which the pieces are connected by fasteners or other means. Body 68 may include an actuator portion 80, a reaction portion 82, and one or more bridge portions 84 connecting portions 80, 82.

Referring to FIG. 3, actuator portion 80 houses piston 76, lever 78 and other components used to urge brake pads 34, 36 against rotor 16. Actuator portion 80 is configured to be disposed on an inboard side of rotor 16. Referring again to FIG. 4, actuator portion 80 defines a mounting flange 86 configured to support brake actuator 38. Mounting flange 86 defines a pushrod bore 88 configured to receive pushrod 46 of actuator 38. Flange 86 also defines a pair of fastener bores 90, 92 that are configured to receive the shanks of fasteners 60 extending from actuator 38. Bores 90, 92 may be disposed on diametrically opposite sides of pushrod bore 88. Although flange 86 includes two fastener bores 90, 92 in the illustrated embodiment, it should be understood that the number of fastener bores may vary depending on the number of fasteners 60 used to secure actuator 38 to caliper 40. As discussed in greater detail below, fastener bores 90, 92 are configured to allow the orientation of fasteners 60 to vary within fasteners bores 90, 92 and facilitate attachment of brake actuator 38 to caliper 40.

Referring again to FIG. 3, reaction portion 82 is provided to urge outboard brake shoe 36 towards the outboard side of rotor 16 and into engagement with the outboard side of rotor 16 in response to movement of lever 78 by actuator 38 during actuation of brake 18. Reaction portion 82 is configured to be disposed on an outboard side of rotor 16. Referring to FIGS. 1-2, reaction portion 82 may support a brake pad retainer 94 that extends from reaction portion 82 to actuator portion 80 and is disposed radially outwardly of rotor 16 and brake pads 34, 36. Referring to FIG. 2, retainer 94 may be secured to reaction portion 82 by a pin 96 and spring clip 98 or other suitable means for maintaining retainer 94 in a closed position. Retainer 94 may be moved to an open position or removed when access to brake pads 34, 36 is required during maintenance.

Referring again to FIG. 4, bridge portions 84 are provided to connect actuator portion 80 and reaction portion 82. Bridge portions 84 extend between the actuator portion 80 and the reaction portion 82 and are configured to be disposed radially outward rotor 16.

Referring again to FIG. 2, bushings 70, guide pins 72 and bolts 74 provide a means for coupling caliper 40 to carrier 32 and permitting movement of caliper 40 relative to carrier 32. Actuator portion 80 of body 68 defines bores (not shown) that are aligned with carrier 32 in a direction parallel to the rotational axis of the vehicle wheel and that are configured to receive bushings 70, pins 72 and bolts 74 therein. Pins 72 extend through the bores and engage a face of carrier 32 which is shaped to receive one longitudinal end of each pin 72. Each pin 72 has a counterbored hole that aligns with a corresponding bore in carrier 32 and bolts 74 are inserted into the counterbored holes and the aligned bores in carrier 32 to secure pins 72 against carrier 32. Bushings 70 are disposed about pins 72 within the bores in actuator portion 80 of caliper body 68 and allow body 68 to move relative to carrier 32 in a direction parallel to the rotational axis of the vehicle wheel.

Referring again to FIG. 3, piston 76 provides a means for urging inboard brake pad 34 towards the inboard side of rotor 16. Piston 76 may include a bridge 100 disposed within actuator portion 80 of caliper body 68. One end of bridge 100 is coupled to lever 78 and bridge 100 is configured to move in response to movement of lever 78 by pushrod 46 of actuator 38. Bridge 100 may define a bore at an opposite end configured to receive a return spring 102 that is disposed between opposed spring seats in bridge 100 and a wall of actuator portion 80 of caliper body 68. Spring 102 biases bridge 100, and piston 76 generally, away from inboard brake pad 34 when brake 18 is released. Referring to FIG. 2, piston 76 may support one or more tappets 104 or spindles that extend outward from bridge 100 through openings in actuator portion 80 of caliper body 68 for engagement with inboard brake pad 34 when brake 18 is applied.

Referring again to FIG. 3, lever 78 provides a means to cause movement of piston 76 and caliper body 68 in response to movement of pushrod 46 and to multiply the force of brake actuator 18. Lever 78 is disposed within actuator portion 80 of body 68. One end of lever 78 is configured to receive one end of pushrod 46 and may define a semi-hemispherical recess for receiving the end of pushrod 46 in some embodiments. The opposite end of lever 78 is configured to engage piston 76 (and, in particular, bridge 100 of piston 76). A portion of lever 78 is supported on an eccentric bearing 106 located on an internal surface of actuator portion 80 of body 68 opposite piston 76. Bearing 106 minimizes friction and hysteresis and lever 78 pivots on bearing 106. During application of brake 18, actuator 38 causes pushrod 46 to extend into actuator bore 88 of actuator portion 80 of caliper 40. Pushrod 46 causes movement of lever 78 which in turn urges piston 76 outward from actuator portion 80 in a first direction (to the left in FIG. 3) to force inboard brake pad 34 towards the inboard side of rotor 16. The same action forces caliper body 68 in a second, opposite direction (to the right in FIG. 3) to bring reaction portion 82 of body 68 into engagement with outboard brake pad 36 and force outboard brake pad 36 towards the outboard side of rotor 16.

Figure 5:
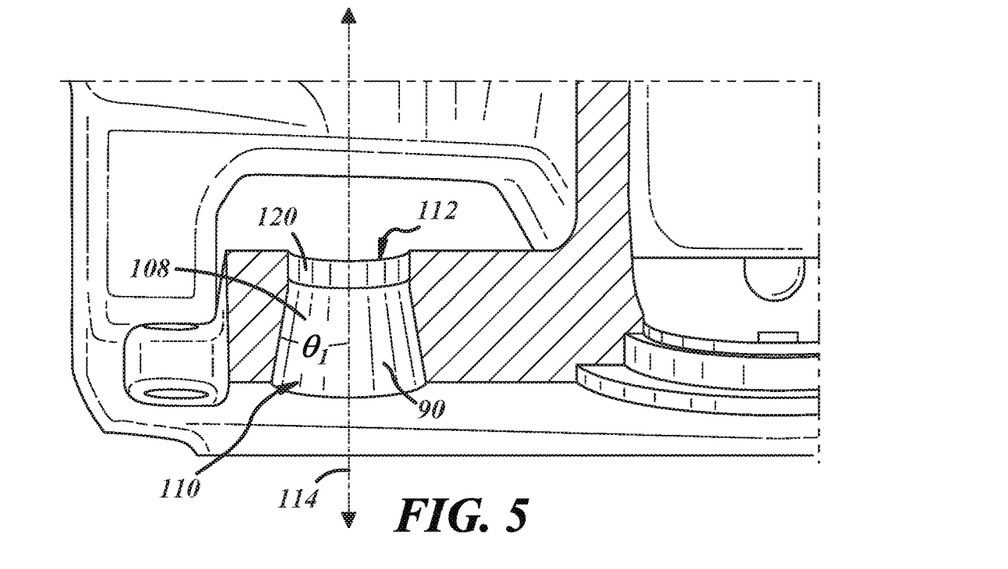
FIG. 5 is an enlarged cross-sectional view of a portion of the caliper of FIG. 4.

Referring again to FIG. 4, in accordance with one aspect of the present teachings, fastener bores 90, 92 in mounting flange 86 are configured to facilitate attachment of brake actuator 38 to caliper 40 by permitting variation in the orientation of fasteners 60 as actuator 38 moves towards and away from mounting flange 86 of caliper 40 and thereby permit greater access for tools used in mounting actuator 38 to caliper 40 and removing actuator 38 from caliper 40 during maintenance. Referring to FIG. 5, each fastener bore 90, 92 has a diameter that varies along at least a portion 108 of the length of the fastener bore 90, 92 beginning at an end 110 of the fastener bore 90, 92 proximate actuator 38 and tapering moving towards an opposite end 112 of the fastener bore 90, 92 distant from actuator 38. In some embodiments, portion 108 comprises about eighty (80) percent of the length of each bore 90, 92. The diameter of portion 108 may taper constantly along the length of portion 108 and may assume a conical shape. It should be understood, however, that the diameter may taper in a non-constant manner (e.g., in a series of small steps). Fasteners bores 90, 92 taper at an angle $\theta_1$ relative to the center axis 114 of the fastener bore 90, 92. Referring to FIG. 3, in some embodiments, angle $\theta_1$ may be equal to an angle $\theta_2$ between the translational axis 64 of the pushrod 46 (or the center axis of pushrod bore 88 which may be coincident with axis 64) and a translational axis 116 of piston 76 or may be equal to an angle $\theta_3$ between axis 64 (or the center axis of pushrod bore 88 which may be coincident with axis 64) and an axis 118 about which rotor 16 rotates (which may be coincident with the rotational axis of the vehicle wheel and parallel to piston axis 116). Referring again to FIG. 5, each fastener bore 90, 92 may also have a constant diameter over another portion 120 of the length of the bore 90, 92. Portion 120 is disposed proximate end 112 of bore 90, 92 and may comprise about twenty (20) percent of the length of each bore 90, 92 in certain embodiments.

Figure 6A:
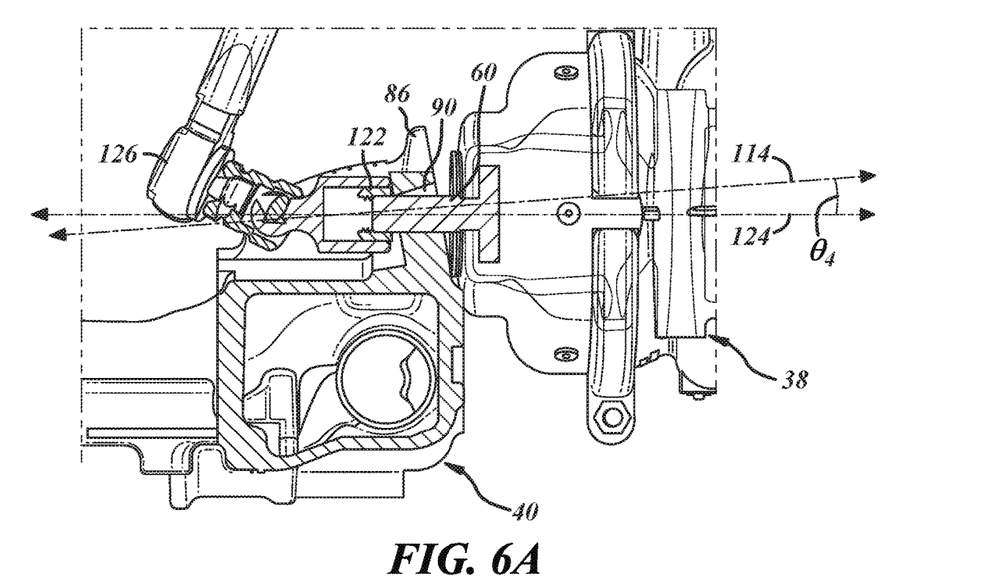
Figure 6B:
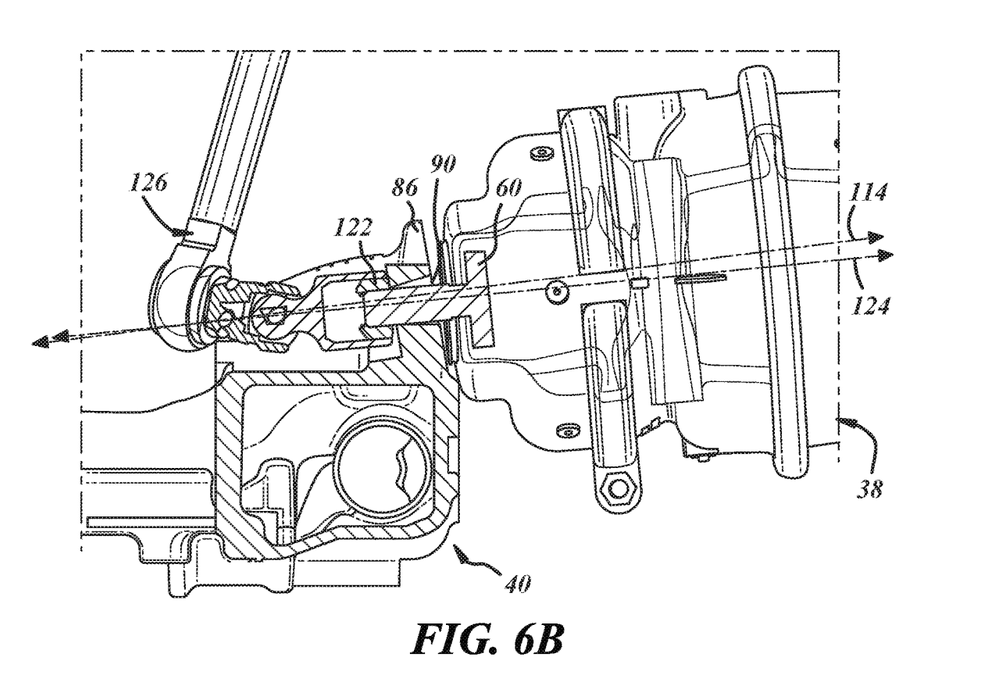
Figure 6C:
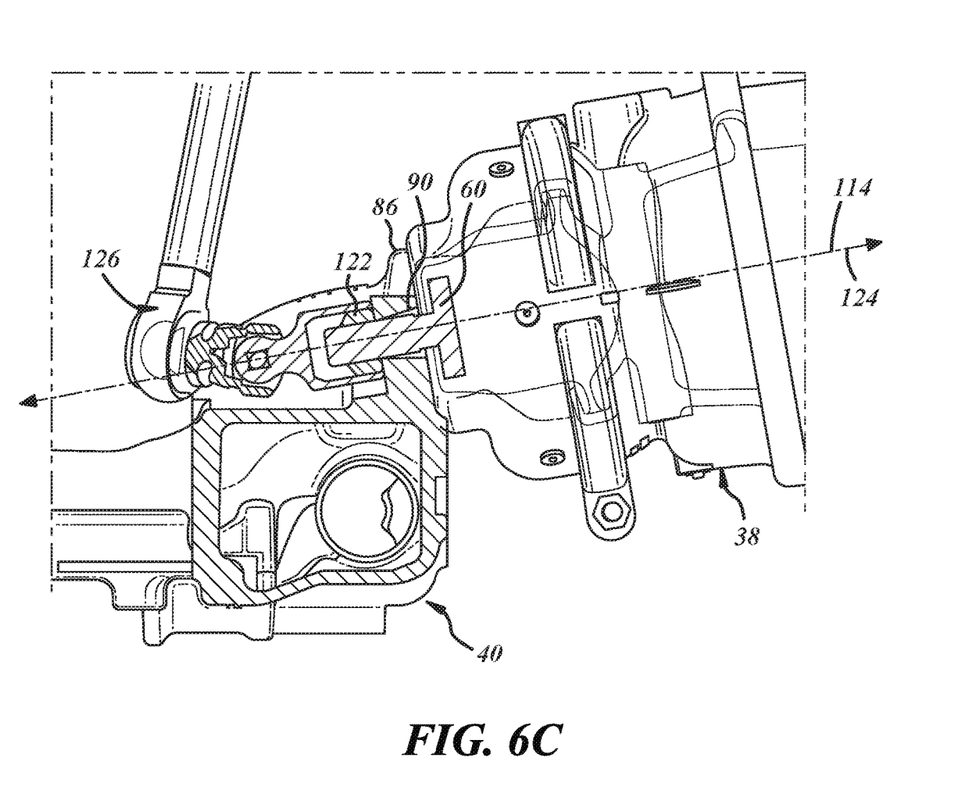

Referring now to FIGS. 6A-6C, a method for mounting a brake actuator 38 on a caliper 40 of a disc brake 18 will be described. The method may begin with the step of positioning actuator 38 such that pushrod 46 is aligned with pushrod bore 88 in mounting flange 86 of caliper 40. As used herein, aligned may include situations in which pushrod 46 is centered or off-center relative to pushrod bore 46 and in which axis 64 of pushrod 46 is coincident, parallel or angled relative to a center axis of pushrod bore 46. To the extent that actuator 38 already has fasteners 60 extending from housing 44, the method may also include the step of aligning fasteners 60 with fastener bores 90, 92 in mounting flange 86 of caliper 40. If actuator 38 does not include pre-installed fasteners 60 the method may alternatively include the step of aligning fastener bores in housing 44 of actuator 38 with fastener bore s 90, 92 in mounting flange 86 of caliper 40.

The method may continue with the step of inserting a shank of each fastener 60 through fasteners bores 90, 92 in mounting flange 86. To the extent that actuator 38 already has fasteners 60 extending from housing 44, the shank of each fastener 60 will be inserted from end 110 of fastener bores 90, 92 and project out from end 112 of fastener bores 90, 92 and may include a plurality of threads configured to receive nuts 122. If actuator 38 does not include pre-installed fasteners 60 each fastener 60 will be inserted from end 112 of fastener bores 90, 92 and project out from end 110 of fasteners bores 90, 92 into corresponding bores in housing 44 of actuator 38.

Referring to FIG. 6A, the method may continue with the step of orienting the fasteners 60 such that a longitudinal axis 124 of each fastener 60 is at an angle $\theta_4$ relative to a center axis 114 of the fastener bore 90, 92. Because of the shape of fastener bores 90, 92 fasteners 60 may assume various orientations (compare FIGS. 6A-6C) and do not have to assume an orientation in which the longitudinal axis 124 of the fastener 60 is coincident with the center axis 114 of the fastener bore 90, 92. As a result, nut 122 (to the extent actuator 38 has pre-installed fasteners 60) or the head of the fastener 60 (to the extent actuator 38 lacks pre-installed fasteners 60) may assume varying orientations such that the center axis 124 of the nut 122 or the head of the fastener 60, respectively, is not coincident with the center axis 114 of the fastener bore 90. This arrangement provides increased access for tools 126 used to rotate the nut 122 or head of the fastener 60, respectively.

Referring to FIGS. 6B-6C, the method may continue with the step of drawing actuator 38 towards caliper 40 such that the longitudinal axis 124 of each fastener 60 is drawn parallel to or coincident with the enter axis 114 of the fastener bore 90, 92. In situations where actuator 38 has pre-installed fasteners 60, this step may include the substeps of placing a nut 122 about the shank of each fastener 60 on a side of mounting flange 86 opposite actuator 38 and rotating nut 122 with tool 126. In situations where actuator 38 lacks pre-installed fasteners 60, this step may include the substeps of grasping the head of each fastener 60 with tool 126 on a side of mounting flange 86 opposite actuator 38 and rotating the fastener 60 with tool 126 to thread the fastener 60 into actuator 38. Where multiple fasteners 60 are used to attach actuator 38 to caliper 40, tool 126 may be configured to simultaneously rotate multiple nuts 122 or fasteners 60 (depending on whether fasteners 60 are pre-installed on actuator 38). Alternatively, tool 126 may be configured to rotate one nut 122 or fastener 60 before another nut 122 or fastener 60 (e.g., where caliper 40 is configured such that, or the surrounding environment dictates that, one nut 122 or fastener 60 must be rotated prior to another nut 122 of fastener 60 to provide sufficient clearance for rotation of the latter nut 122 of fastener 60).

A caliper 40 in accordance with the present invention represents an improvement relative to calipers for disc brakes. In particular, the configuration of the fastener bores 90, 92 in the brake actuator mounting flange 86 of the caliper 40 allows the fasteners 60 used to couple the actuator 38 to the caliper 40 to be oriented at an angle relative to the center axis 114 of the fastener bores 90, 92 when the fasteners 60 are initially inserted into the bores 90, 92. This orientation provides additional space on the side of the mounting flange 86 opposite the brake actuator 38 for a tool 126 to grasp either the fastener 60 or a nut 122 disposed about the fastener 60. The inventive caliper 40 also enables assembly without any special modifications to existing tools 126.

While the invention has been shown and described with reference to one or more particular embodiments thereof it will be understood by those of skill in the art that various changes and modifications can be made without departing from the spirit and scope of the invention.

What is claimed is:

1. A caliper for a disc brake, comprising:
an actuator portion configured to be disposed on a first side of a rotor, the actuator portion configured to house a piston and a lever and defining a mounting flange configured for mounting a brake actuator, the piston configured to urge a first brake pad towards the first side of the rotor in response to movement of the lever by the brake actuator;
a reaction portion configured to be disposed on a second side of the rotor opposite the first side of the rotor, the reaction portion configured to urge a second brake pad towards the second side of the rotor in response to movement of the lever by the brake actuator; and
a bridge portion extending between the actuator portion and the reaction portion and configured to be disposed radially outward of the rotor
wherein the mounting flange of the actuator portion defines a pushrod bore configured to receive a pushrod of the brake actuator and a first fastener bore configured to receive a shank of a first fastener extending from the brake actuator, the first fastener bore having a diameter that varies along at least a first portion of a length of the first fastener bore beginning from a first end of the first fastener bore proximate the brake actuator and tapering moving towards a second end of the first fastener bore distant from the brake actuator
wherein the first fastener bore tapers at an angle relative to a center axis of the first fastener bore, the angle equal to an angle between a center axis of the pushrod bore and a translational axis of the piston.

2. The caliper of claim 1 wherein the first portion of the length of the first fastener bore has a conical shape.

3. The caliper of claim 1 wherein the first fastener bore has a constant diameter over a second portion of the length of the fastener bore.

4. The caliper of claim 3 wherein the first portion of the length of the first fastener bore comprises about eighty percent of the length of the first fastener bore.

5. The caliper of claim 1 wherein the angle is equal to an angle between an axis along which the pushrod of the brake actuator moves and an axis about which the rotor rotates.

6. The caliper of claim 1 wherein the mounting flange of the actuator portion defines a second fastener bore configured to receive a shank of a second fastener extending from the brake actuator, the second fastener bore having a diameter that varies along at least a first portion of a length of the second fastener bore beginning from a first end of the second fastener bore proximate the brake actuator and tapering moving towards a second end of the second fastener bore distant from the brake actuator.

7. A disc brake, comprising:
a carrier configured to support first and second brake pads; and,
a caliper coupled to the carrier and configured for movement relative to the carrier, the caliper comprising
an actuator portion configured to be disposed on a first side of a rotor, the actuator portion configured to house a piston and a lever and defining a mounting flange configured for mounting a brake actuator, the piston configured to urge the first brake pad towards the first side of the rotor in response to movement of the lever by the brake actuator;
a reaction portion configured to be disposed on a second side of the rotor opposite the first side of the rotor, the reaction portion configured to urge the second brake pad towards the second side of the rotor in response to movement of the lever by the brake actuator; and
a bridge portion extending between the actuator portion and the reaction portion and configured to be disposed radially outward of the rotor
wherein the mounting flange of the actuator portion defines a pushrod bore configured to receive a pushrod of the brake actuator and a first fastener bore configured to receive a shank of a first fastener extending from the brake actuator, the first fastener bore having a diameter that varies along at least a first portion of a length of the first fastener bore beginning from a first end of the first fastener bore proximate the brake actuator and tapering moving towards a second end of the first fastener bore distant from the brake actuator
wherein the first fastener bore tapers at an angle relative to a center axis of the first fastener bore, the angle equal to an angle between a center axis of the pushrod bore and a translational axis of the piston.

8. The disc brake of claim 7 wherein the first portion of the length of the first fastener bore has a conical shape.

9. The disc brake of claim 7 wherein the first fastener bore has a constant diameter over a second portion of the length of the fastener bore.

10. The disc brake of claim 9 wherein the first portion of the length of the first fastener bore comprises about eighty percent of the length of the first fastener bore.

11. The disc brake of claim 7 wherein the angle is equal to an angle between an axis along which the pushrod of the brake actuator moves and an axis about which the rotor rotates.

12. The disc brake of claim 7 wherein the mounting flange of the actuator portion defines a second fastener bore configured to receive a shank of a second fastener extending from the brake actuator, the second fastener bore having a diameter that varies along at least a first portion of a length of the second fastener bore beginning from a first end of the second fastener bore proximate the brake actuator and tapering moving towards a second end of the second fastener bore distant from the brake actuator.

13. A method for mounting a brake actuator on a caliper of a disc brake, comprising the steps of:
positioning the brake actuator such that a pushrod of the brake actuator is aligned with a pushrod bore in a mounting flange of the caliper;
inserting a shank of a first fastener through a first fastener bore in the mounting flange, the first fastener configured to couple the brake actuator to the caliper, wherein the first fastener bore has a diameter that varies along at least a first portion of a length of the first fastener bore beginning from a first end of the first fastener bore proximate the brake actuator and tapering moving towards a second end of the first fastener bore distant from the brake actuator;
orienting the first fastener such that a longitudinal axis of the first fastener is at an angle relative to a center axis of the first fastener bore; and, drawing the brake actuator towards the caliper such that the longitudinal axis of the first fastener is drawn parallel to or coincident with the center axis of the first fastener bore.

14. The method of claim 13 wherein the first fastener is fixed to the brake actuator prior to the inserting step and the drawing step comprises the substeps of:
placing a first nut about the shank of the first fastener on a side of the mounting flange opposite the brake actuator; and,
rotating the first nut with a tool.

15. The method of claim 14 wherein the first fastener bore has a constant diameter over a second portion of the length of the fastener bore.

16. The method of claim 15 wherein the first portion of the length of the first fastener bore comprises about eighty percent of the length of the first fastener bore.

17. The method of claim 13 wherein the drawing comprises the substep of rotating the first fastener with a tool.

18. The method of claim 13 wherein the first portion of the length of the first fastener bore has a conical shape.

19. The method of claim 13 wherein the first fastener bore tapers at an angle relative to a center axis of the first fastener bore, the angle equal to an angle between a center axis of the pushrod bore and a translational axis of the piston.

20. The method of claim 13 wherein the first fastener bore tapers at an angle relative to a center axis of the first fastener bore, the angle equal to an angle between an axis along which the pushrod of the brake actuator moves and an axis about which the rotor rotates.

* * * * *